US009016660B2

(12) United States Patent
Leventhal et al.

(10) Patent No.: US 9,016,660 B2
(45) Date of Patent: Apr. 28, 2015

(54) ELECTROMAGNETIC VALVE

(75) Inventors: Leon Leventhal, Canton, MI (US);
Peter J. Luzenski, Troy, MI (US);
Gregory J. Krawczyk, Livonia, MI (US); Nikolaos Manolios, Sterling Heights, MI (US); William D. Doyle, Chelsea, MI (US); Kenneth Greco, Livonia, MI (US); Jeff Thompson, Commerce Township, MI (US)

(73) Assignee: Kelsey-Hayes Company, Livonia, MI (US)

(*) Notice: Subject to any disclaimer, the term of this patent is extended or adjusted under 35 U.S.C. 154(b) by 289 days.

(21) Appl. No.: 13/574,898

(22) PCT Filed: Feb. 3, 2011

(86) PCT No.: PCT/US2011/023625
§ 371 (c)(1),
(2), (4) Date: Jan. 28, 2013

(87) PCT Pub. No.: WO2011/097395
PCT Pub. Date: Aug. 11, 2011

(65) Prior Publication Data
US 2013/0161545 A1 Jun. 27, 2013

Related U.S. Application Data

(60) Provisional application No. 61/301,171, filed on Feb. 3, 2010.

(51) Int. Cl.
*F16K 31/06* (2006.01)
*B60T 8/36* (2006.01)
*B60T 8/48* (2006.01)

(52) U.S. Cl.
CPC .............. *F16K 31/0658* (2013.01); *B60T 8/363* (2013.01); *B60T 8/4872* (2013.01)

(58) Field of Classification Search
USPC .......................... 251/129.02, 129.05, 129.15; 137/843–860; 303/119.1, 119.2
See application file for complete search history.

(56) References Cited

U.S. PATENT DOCUMENTS 5,167,442 A * 12/1992 Alaze et al. ................ 303/113.2
5,603,483 A * 2/1997 Reuter et al. ............. 251/129.02
(Continued)

FOREIGN PATENT DOCUMENTS

CN 101407214 A 4/2009
DE 19922334 A1 9/2000
(Continued)

OTHER PUBLICATIONS

English Translation of Chinese Office Action, Application No. 201180008215.2 dated Jun. 28, 2013.

*Primary Examiner* — Eric Keasel
(74) *Attorney, Agent, or Firm* — MacMillan, Sobanski & Todd, LLC

(57) ABSTRACT

An electromagnetic valve for use in controlling fluid flow between first and second passageways in a hydraulic valve block includes a valve body. The valve body defines a central axis, has a central opening therethrough, and has a lower end adapted to be inserted into a bore of the valve block. A hollow valve dome is attached to an upper end of the valve body. An armature is axially moveable within the valve dome. A spring biases the armature in one axial direction. A closing element is coupled to a lower end of the armature. An electromagnetic coil coaxially surrounds the armature and is operable to effect axial movement of the armature in an axial direction opposite the one axial direction. A valve seat member is carried by a lower end of the valve body and has an orifice providing fluid flow between the first and second valve block passageways. The valve seat member defines a valve seat that surrounds the orifice and cooperates with the closing element for selectively closing the orifice. The valve seat member is formed as a deep drawn part and includes a tubular portion having one end defining a valve seat, and an opposite end connected to the valve body.

20 Claims, 8 Drawing Sheets

(56) References Cited

U.S. PATENT DOCUMENTS

| | | |
|---|---|---|
| 5,626,326 A | 5/1997 | Goossens et al. |
| 5,669,675 A | 9/1997 | Mueller et al. |
| 5,673,980 A | 10/1997 | Schwarz et al. |
| 5,788,344 A | 8/1998 | Friedow et al. |
| 5,836,334 A | 11/1998 | Mittwollen et al. |
| 5,971,501 A | 10/1999 | Hosoya |
| 6,003,838 A | 12/1999 | Beck |
| 6,086,164 A | 7/2000 | Oehler et al. |
| 6,092,781 A | 7/2000 | Hohl et al. |
| 6,113,066 A | 9/2000 | Hohl et al. |
| 6,152,420 A | 11/2000 | Hohl |
| 6,189,985 B1 | 2/2001 | Fritsch et al. |
| 6,247,766 B1 | 6/2001 | Subramanian et al. |
| 6,254,199 B1 * | 7/2001 | Megerle et al. ............ 303/119.2 |
| 6,637,724 B1 | 10/2003 | Mayer |
| 6,644,623 B1 | 11/2003 | Voss et al. |
| 6,789,779 B2 | 9/2004 | Wilde et al. |
| 7,467,780 B2 | 12/2008 | Kratzer |
| 2005/0173979 A1 | 8/2005 | Voss |
| 2009/0095929 A1 | 4/2009 | Lee |
| 2010/0059698 A1 | 3/2010 | Guggenmos et al. |

FOREIGN PATENT DOCUMENTS

| | | |
|---|---|---|
| DE | 19951665 A1 | 5/2001 |
| DE | 10002269 A1 | 7/2001 |
| DE | 10203325 A1 | 3/2003 |
| DE | 19635690 B4 | 7/2006 |
| DE | 19951665 B4 | 1/2010 |
| JP | 2002347597 A | 12/2002 |
| KR | 10-1999-0086832 A | 12/1999 |
| WO | 0130626 A1 | 5/2001 |
| WO | 2005066531 A1 | 7/2005 |
| WO | 2008058803 A1 | 5/2008 |
| WO | 2010142509 A1 | 12/2010 |

* cited by examiner

ELECTROMAGNETIC VALVE

CROSS-REFERENCE TO RELATED APPLICATIONS

This application is the National Phase of International Application PCT/US2011/023625 filed Feb. 3, 2011 which designated the U.S. and that International Application was published in English under PCT Article 21(2) on Aug. 11, 2011 as International Publication Number WO 2011/097395 A2. PCT/US2011/023625 claims priority to U.S. Provisional Application No. 61/301,171, filed Feb. 3, 2010. Thus, the subject nonprovisional application also claims priority to U.S. Provisional Application No. 61/301,171, filed Feb. 3, 2010. The disclosures of both applications are incorporated herein by reference.

BACKGROUND

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used in the description of the invention and the appended claims, the phrase "analog control" is defined as the ability to control a device such that an output is proportional to the input.

Various embodiments of a control valve are described herein. In particular, the embodiments described herein are mounted in a hydraulic control unit of an electronically controlled brake system.

Electronically controlled brake systems for vehicles are well known. One type of electronically controlled brake system includes a hydraulic control unit (HCU) connected in fluid communication between a master cylinder and a plurality of wheel brakes. The HCU typically includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a sleeve or flux tube for movement relative to a valve seat. A spring is used to bias the armature in an open or closed position, thereby respectively permitting or blocking fluid flow through the valve. A coil assembly is provided about the sleeve. When the valve is energized, an electromagnetic field or flux generated by the coil assembly causes the armature to respectively slide from the biased open or closed position to a closed or open position.

Control valves mounted in a HCU are actuated by an electronic control unit (ECU) to provide desired braking functions such as anti-lock braking, traction control, and vehicle stability control.

To provide desired braking responses, an armature must respond quickly and in a predictable manner to an electromagnetic field generated by an energized coil assembly.

SUMMARY

The present application describes various embodiments of an electromagnetic valve for use in controlling fluid flow between first and second passageways in a hydraulic valve block. One embodiment of the electromagnetic valve includes a valve body. The valve body defines a central axis, has a central opening therethrough, and has a lower end adapted to be inserted into a bore of the valve block. A hollow valve dome is attached to an upper end of the valve body. An armature is axially moveable within the valve dome. A spring biases the armature in one axial direction. A closing element is coupled to a lower end of the armature. An electromagnetic coil coaxially surrounds the armature and is operable to effect axial movement of the armature in an axial direction opposite the one axial direction. A valve seat member is carried by a lower end of the valve body and has an orifice providing fluid flow between the first and second valve block passageways. The valve seat member defines a valve seat that surrounds the orifice and cooperates with the closing element for selectively closing the orifice. The valve seat member is formed as a deep drawn part and includes a tubular portion having one end defining a valve seat, and an opposite end connected to the valve body.

Other advantages of the electromagnetic valve will become apparent to those skilled in the art from the following detailed description, when read in light of the accompanying drawings.

DETAILED DESCRIPTION

Figure 1:
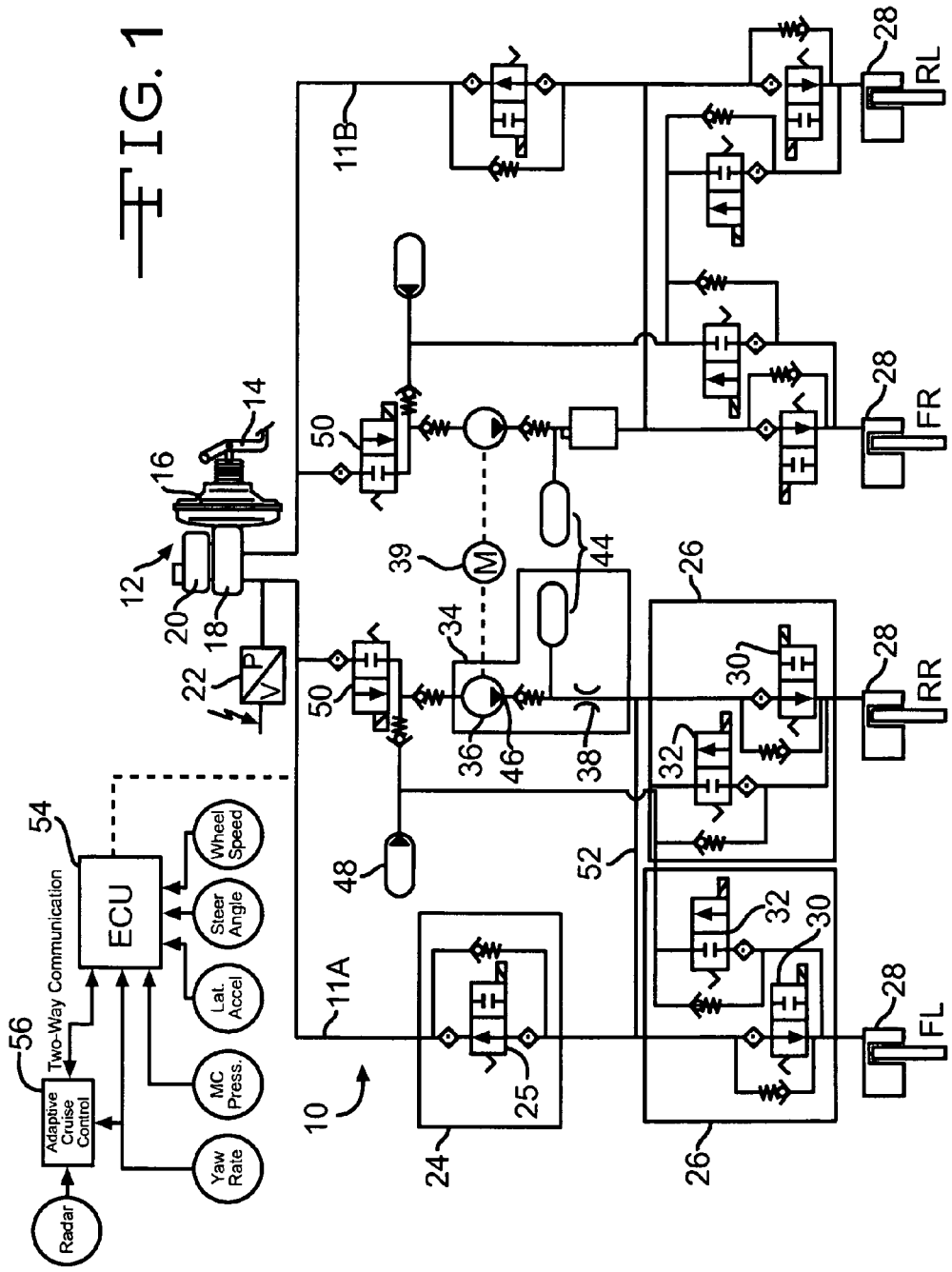
FIG. 1 is a schematic diagram of a vehicle brake system having a normally open isolation valve.

A hydraulic vehicle brake system is indicated generally at 10 in FIG. 1. The illustrated embodiment of the vehicle brake system 10 includes valves and other components described below to provide an electronic brake control capability. The vehicle brake system 10 is intended to be exemplary and it will be appreciated that there are other brake control system configurations that may be used to implement the various valve embodiments described herein. In other embodiments, the brake system 10 may include components to provide an anti-lock braking, traction control, and/or vehicle stability control function.

The vehicle brake system 10 has two separate brake circuits 11A and 11B, respectively, which are depicted on the left and right halves of FIG. 1. In the exemplary embodiment illustrated in FIG. 1, the circuits supply brake pressure to a front and rear wheel brake. The illustrated rear wheel brake is arranged diagonally to the front wheel brake. Only a left brake circuit 11A in FIG. 1 is described in the following in more detail, however a right brake circuit 11B in FIG. 1 is structured in the same manner.

The brake system 10 includes a driver-controlled first pressure generating unit 12 with a brake pedal 14, a power brake unit 16 and a tandem master brake cylinder 18, which presses the brake fluid out of a reservoir 20 into the two brake circuits 11A and 11B. Arranged behind an outlet of the tandem master brake cylinder 18 is a pressure sensor 22 for detecting the driver's input.

Under normal driving conditions, a brake fluid pressure emanating from the driver-controlled first pressure generating unit 12 continues via the block valve arrangement 24 and an anti-lock brake system (ABS) valve arrangement 26 to wheel brake cylinders 28. The ABS valve arrangement 26 includes an ABS inlet or isolation valve 30 and an ABS discharge or dump valve 32. The ABS inlet valve 30 is normally open, and the ABS discharge valve 32 is normally closed. Each wheel brake cylinder 28 includes an ABS valve arrangement 26 and the brake fluid pressure of both brake circuits is distributed diagonally in the vehicle to a respective pair of wheel brake cylinders 28 (front left (FL) and rear right (RR), or front right (FR) and rear left (RL)), respectively. The illustrated block valve arrangement 24 is part of a traction control or vehicle stability control system and includes an isolation valve 25 that is normally open in a currentless state. In a current-carrying state the block valve arrangement 24 is blocked from a backflow of brake fluid from the wheel brake cylinders 28 to the master brake cylinder 18.

Brake fluid pressure may be built up independent of the driver-controlled first pressure generating unit 12 by an autonomous second pressure generating unit 34. The autonomous second pressure generating unit 34 includes a pump 36 driven by a pump motor 39, an attenuator 44, and an orifice 38. The attenuator 44 is in fluid communication with a pump outlet 46 and the inlet side 40 of the orifice 38. Pulsations emanating from the pump 36 are periodic fluctuations in the brake fluid flow. The attenuator 44 takes in brake fluid during the pulsation peaks and releases it again between the pulsation peaks. As a result, the attenuator 44 levels out a temporal pressure progression on the inlet side 40 of the orifice 38.

Arranged on the intake side of the pump 36 are a low pressure accumulator (LPA) 48 and a pump inlet or supply valve 50. The illustrated pump inlet valve 50 is a normally closed valve. When the pump inlet valve 50 is currentless and closed, the pump 36 is supplied with brake fluid from the LPA 48. When the pump inlet valve 50 is current-carrying and open, the pump 36 can also suction brake fluid from the master brake cylinder 18.

The driver-controlled first pressure generating unit 12 and the autonomous second pressure generating unit 34 convey brake fluid in a common brake branch 52 of one of the two brake circuits. As a result, both pressure generating units 12, 34 can build up brake fluid pressure to the wheel brake cylinders 28 of the brake circuit independent of one another.

The vehicle brake system 10 described in the foregoing uses the autonomous second pressure generating unit 34 for generating brake pressure within the scope of a vehicle stability control (VSC function). Moreover, the autonomous second pressure generating unit 34 is also used for the adaptive cruise control (ACC function). In the process, the autonomous second pressure generating unit 34 can build up brake fluid pressure for autonomously braking the vehicle in the course of a stop-and-go function in frequent succession and not just in extraordinary, relatively rare driving situations. This also occurs with predominantly low to moderate driving speeds, at which the basic noise level in the vehicle interior is relatively low. Under such conditions, known pressure generating units represent a source of noise and pulsation that is annoying in terms of driving comfort.

Figure 2:
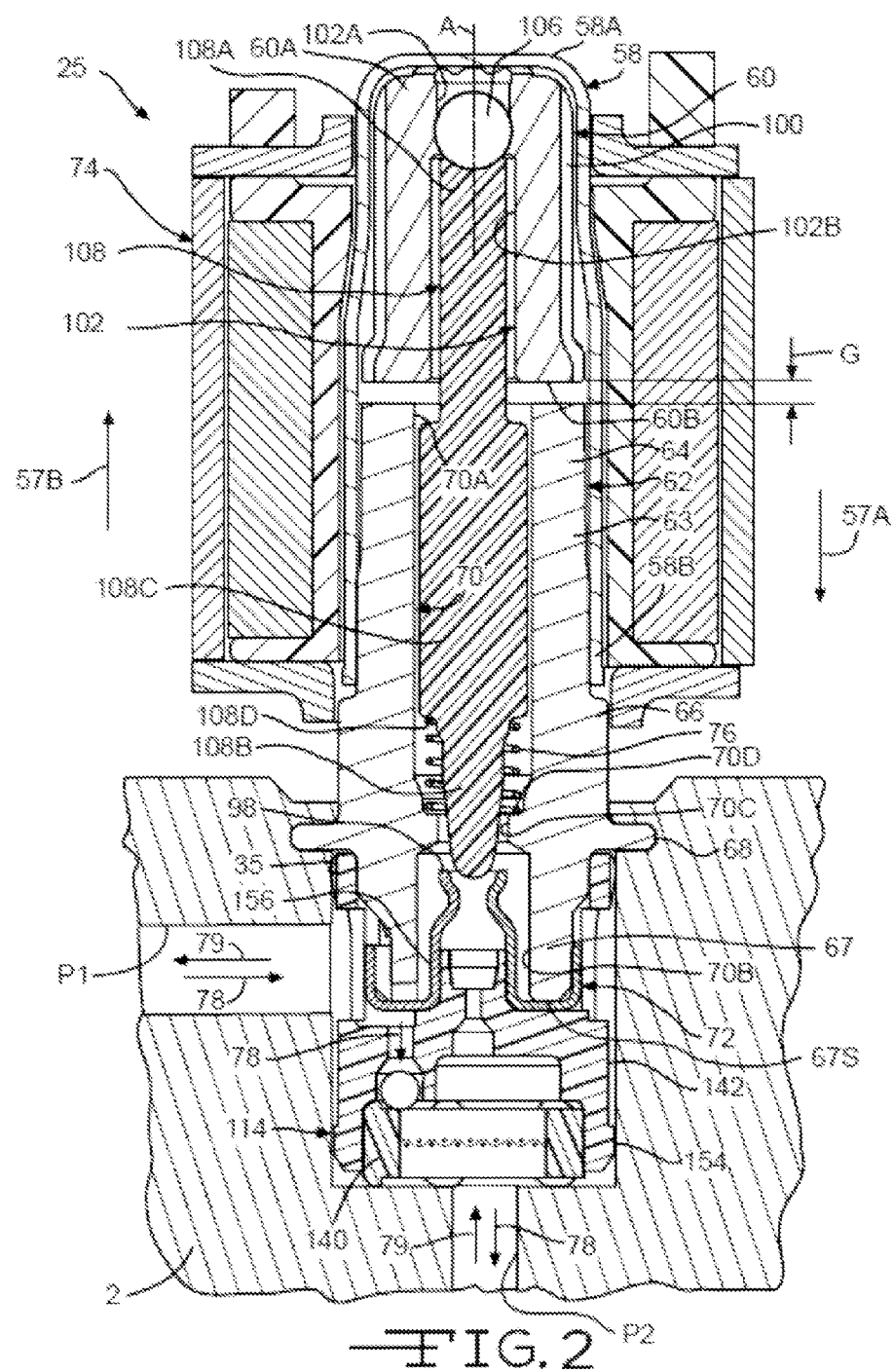
FIG. 2 is a cross-sectional view of the isolation valve illustrated in FIG. 1.

It will be understood that the vehicle brake system 10 may include a hydraulic control unit (HCU) (not shown in FIG. 1) connected in fluid communication between the master brake cylinder 18 and wheel brake cylinders 28. As best shown in FIG. 2, the HCU typically includes a hydraulic valve block or housing 2 containing the various control valves and other components described herein for selectively controlling hydraulic brake pressure at the wheel brake cylinders 28.

As shown at 54 in FIG. 1, the vehicle brake system 10 may include an electronic control unit (ECU) which receives input signals from sensors, such as yaw rate, master cylinder pressure, lateral acceleration, steer angle, and wheel speed sensors. The ECU may also receive ground speed data from the ACC system 56. The ACC system may receive input data from a radar and the vehicle yaw rate sensor. One example of a vehicular control system adapted to control fluid pressure in an electronically-controlled vehicular braking system and an electronically-controlled ACC system is disclosed in U.S. Pat. No. 6,304,808 to Milot, which is incorporated herein by reference.

Figure 3:
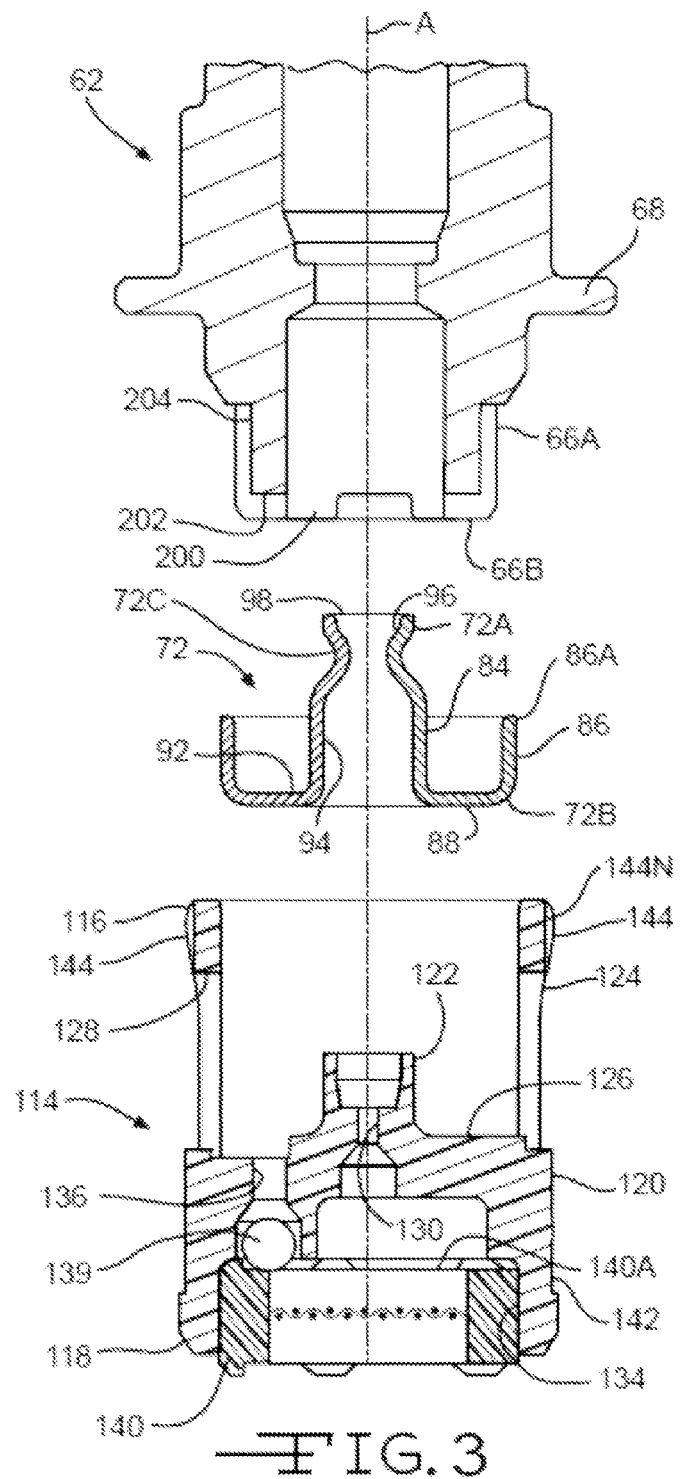
FIG. 3 is an enlarged exploded view of a portion of the isolation valve illustrated in FIG. 2.

A sectional view of an exemplary embodiment of the isolation valve is indicated generally at 25 in FIGS. 2 and 3. The isolation valve 30 may be identical to the isolation valve 25 and will not be described in detail herein.

The isolation valve 25 is received in a bore 35 formed in the housing 2. The isolation valve 25 includes a hollow valve dome or sleeve 58 having a first or closed end 58A and a second or open end 58B and has a central longitudinal axis A. An armature 60 has an upper or first end 60A and a lower or second end 60B and is slidably received in the sleeve 58. A valve body 62 has a generally cylindrical body portion 63 having an upper or first end 64 defining a first diameter portion and a second end or lower 66 defining a second diameter portion. In the illustrated embodiment the second diameter portion is larger than the first diameter portion. The second end 66 of the valve body 62 includes a radially outwardly extending circumferential flange 68. The lower end 66 of the valve body 62 further includes an annular section 67.

A longitudinally extending central opening or bore 70 is formed through the valve body 62. The bore 70 includes a first portion 70A at the first end 64, a second portion 70B at the second end 66 and a third portion 70C between the first and second portions 70A and 70B. In the illustrated embodiment, the first and second portions 70A and 70B have substantially the same diameter and the third portion 70C has a diameter smaller than the diameter of the first and second portions 70A and 70B. The second portion 70B defines a second intermediate passageway for connecting the second passageway P2 to the orifice 96 of the valve seat member 72.

The intersection of the first and third portions, 70A and 70C, respectively, defines a first spring shoulder 70D. The second end 58B of the sleeve 58 is attached to the first end 64 of the valve body 62. The sleeve 58 may be attached to the valve body 62 by any suitable means, such as with a single laser weld. Alternatively, the sleeve 58 may be attached to the valve body 62 by any other desired method.

Figure 4:
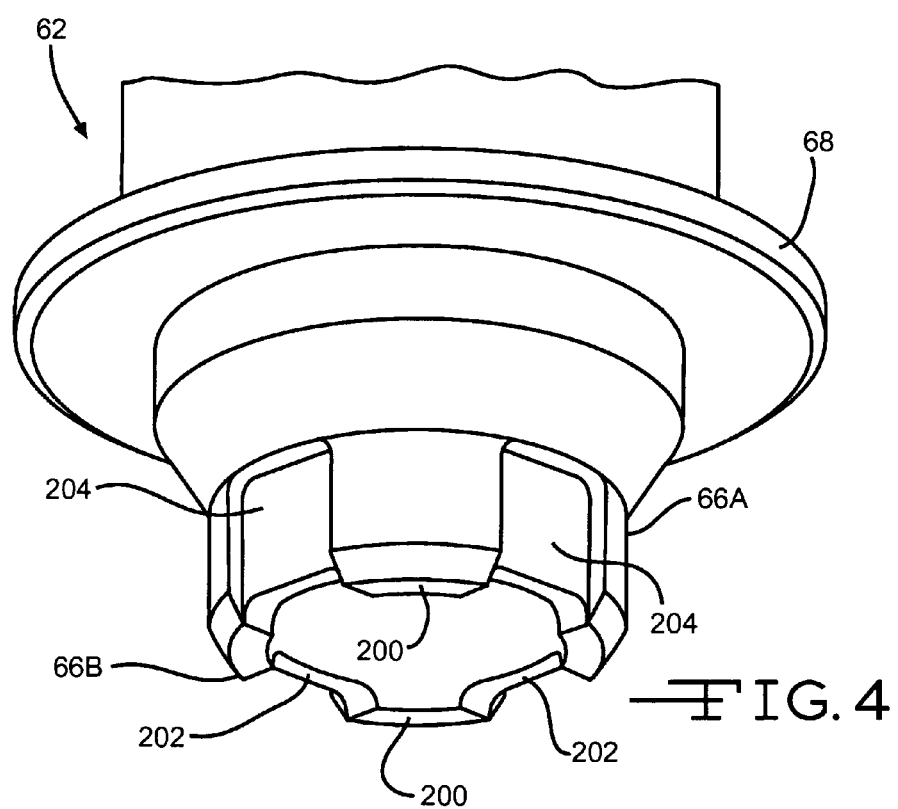
FIG. 4 is an enlarged perspective view of a portion of the valve body illustrated in FIGS. 2 and 3.

Referring now to FIGS. 3 and 4, the second end 66 of the valve body 62 is substantially cylindrical and has an outer surface 66A. A distal end 66B of the second end 66 defines a plurality of circumferentially spaced castellations 200. A plurality of notches 202 are circumferentially arranged between adjacent castellations 200. Grooves 204 are formed in the outer surface 66A of the second end 66 and axially from the notches 202 toward the flange 68. When the valve body 62 is assembled as part of the valve 25, the grooves 204 and the notches 202 define a fluid flow path for fluid flowing through the brake circuit 11A and into the valve 25, as shown by the arrows 206.

The isolation valve 25 further includes a valve seat member 72 and a coil assembly 74 disposed about the sleeve 58. Because the isolation valve 25 is a normally open valve, the tappet 108 (described in detail below) is biased away from contact with the valve seat member 72 by a spring 76 when the coil assembly 74 of the isolation valve 25 is not energized, thereby allowing fluid to flow through the isolation valve 25 in one of two directions. Fluid may flow in the direction of the arrows 78, such as for example, in a traction control release mode. Alternatively, fluid may flow in the direction of the arrows 79, such as for example, in an ABS apply mode. When the coil assembly 74 is energized, the tappet 108 is urged toward the valve seat member 72 to block fluid flow through the isolation valve 25.

In the illustrated embodiment, the sleeve 58 is formed as a single piece from ferromagnetic material in a deep drawing process. An example of suitable ferromagnetic material is low-carbon steel. It will be understood however, that low-carbon steel is not required, and that the sleeve 58 may be formed from any other desired ferromagnetic material.

The valve seat member 72 includes an upper or first end 72A and a lower or second end 72B. The valve seat member 72 further includes a substantially cylindrical inner wall 84 defining an inner cylindrical portion and concentrically arranged within a substantially cylindrical outer wall 86. The outer wall 86 defines an outer cylindrical portion. The inner wall 84 and the outer wall 86 are connected by a radial connecting or base wall 88 having at least one opening or fluid passage 89 formed through the base wall 88. The inner wall 84, outer wall 86, and base wall 88 define an annular groove 92. In the illustrated embodiment, an upper end 86A of the outer cylindrical portion 86 is press fit over an outside of the annular section 67 of the valve body 62. The annular section 67 further defines a downwardly facing axial stop surface 67S configured for engagement with the valve seat member 72.

Figure 7:
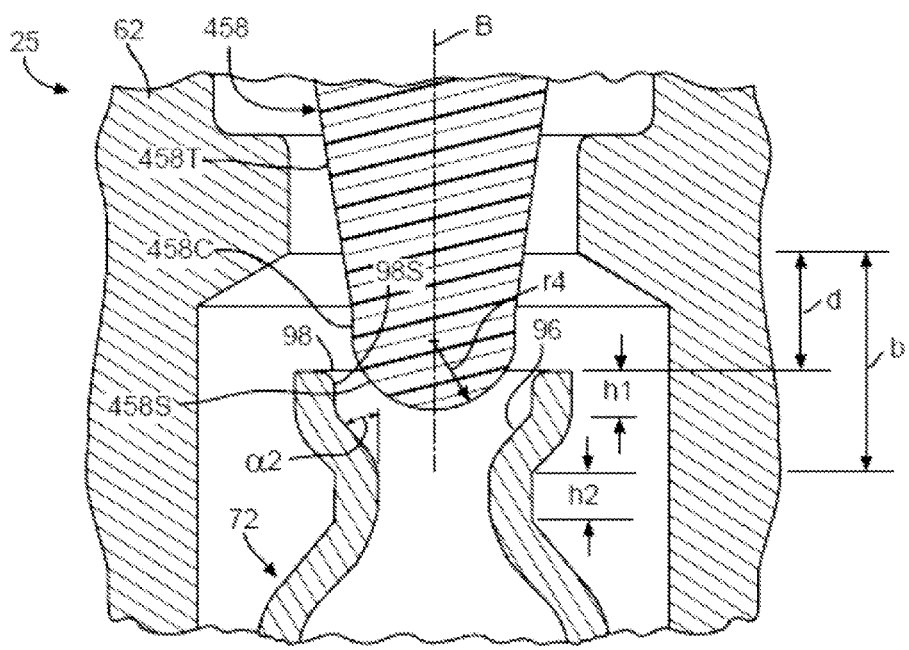
FIG. 7 is an enlarged cross-sectional view of a portion of the isolation valve illustrated in FIG. 2.

The valve seat member 72 includes a longitudinal fluid passage 94 that terminates at the first end 72A in a reduced diameter orifice or opening 96 defining a valve seat 98. The inner cylindrical portion 84 defines a first intermediate passageway 94 which connects the first passageway P1 to the orifice 96 of the valve seat member 72. The outer cylindrical portion 86 and the annular section 67 cooperate to define a second intermediate passageway 70B which connects the second passageway P2 to the orifice 96 of the valve seat member 72. As best shown in FIG. 7, the outer (upper when viewing FIG. 7) inside surface of the valve seat 98 defines a valve seal shoulder 98S. The valve seat shoulder 98S may have any desired radius. In the illustrated embodiment, the radius may be defined as a ratio wherein the valve seat shoulder radius $98S_r = 0.08 \ast$ spherical radius r4. The valve seat shoulder radius $98S_r$ may also be within the range of from about $0.06 \ast$ spherical radius r4 to about $0.10 \ast$ spherical radius r4. Alternatively, the valve seat shoulder radius $98S_r$ may be within the range of from about $0.04 \ast$ spherical radius r4 to about $1.12 \ast$ spherical radius r4.

In the illustrated embodiment, the valve seat member is a deep drawn part formed from ferromagnetic material in a cold forming process. An example of suitable ferromagnetic material is low-carbon steel. It will be understood however, that low-carbon steel is not required, and that the valve seat member 72 may be formed from any other desired ferromagnetic material. The second end 66 of the valve body 62 may be press-fit within the annular groove 92 of the valve seat member 72.

The armature 60 is slidably received in the sleeve 58. In the exemplary embodiment illustrated, at least one longitudinal groove 100 is formed in an outer surface of the armature 60. A longitudinal bore 102 is formed through the armature 60 and includes a first portion 102A at the first end 60A and a second portion 102B at the second end 60B. The first portion 102A has a diameter smaller than a diameter of the second portion 102B.

A spherical valve part or ball 106 is pressed into the first portion 102A of the bore 102. In the illustrated embodiment, the ball 106 is formed from steel. Alternatively, the ball 106 may be formed from any other substantially non-deformable metal or non-metal.

A first embodiment of a closing element or tappet 108 includes a first end 108A, a second end 108B, and a third or central portion 108C between the first and second portions 108A and 108B. In the illustrated embodiment, the first end 108A and the second end 108B have diameters smaller than a diameter of the central portion 108C. The intersection of the second end 108B and the central portion 108C defines a second spring shoulder 108D. The first end 108A of the tappet 108 is disposed in the second portion 102B of the armature bore 102 and the second end 108B and the central portion 108C are disposed in the bore 70 of the valve body 62. The tappet 108 may be formed from any desired material such as polyphenylene sulfide (PPS), polythalamide (PPA), polyetheretherketone (PEEK), stainless steel, and other metal and non-metal material.

A distal portion of the second end 108B is rounded and acts as a valve sealing element and engages the valve seat 98 when the valve 25 is in the closed position (e.g. when the coil assembly 74 is energized). It will be understood that the second end 108B may have any shape suitable for creating a sealing engagement with the valve seat 98.

The spring 76 is disposed about an outer surface of the second end 108B of the tappet 108 between the first and second spring shoulders 70D and 108D, respectively. The spring 76 urges the tappet 108 in a first one axial direction (in the direction of the arrow 57B) away from the valve seat member 72 when the isolation valve 25 is in the open position. When the coil assembly 74 is energized, the tappet 108 moved axially in a second axial direction opposite the first axial direction (in the direction of the arrow 57A) toward the valve seat member 72, such that the isolation valve 25 is in a closed position (not shown).

In the open position, as shown in FIG. 2, the armature 60 is spaced a longitudinal distance G from the valve body 62. When the coil assembly 74 is energized and the tappet 108 moves axially toward the valve seat member 72 and the closed position, it is desirable to maintain a minimum air gap G. In the illustrated embodiment, the minimum air gap G is about 0.10 mm.

During manufacture, the ball 106 is pressed into the bore 102 at a depth chosen to ensure a desired position of the tappet 108 relative to the armature 60 to achieve the desired minimum air gap G during actuation of the valve 25. It will be understood that the minimum air gap G may vary and that the position of the ball 106 may be adjusted during manufacture to ensure the desired position of the tappet 108 relative to the armature 60 to achieve the desired minimum air gap G.

In the illustrated embodiment, the armature 60 is formed from ferromagnetic material in a cold forming process. An example of suitable ferromagnetic material is low-carbon steel. It will be understood however, that low-carbon steel is not required, and that the armature 60 may be formed from any other desired ferromagnetic material. An electrical coil 112 is disposed about the sleeve 58 and armature 60 and selectively induces a magnetic flux in the armature 60.

A first embodiment of a check valve and filter assembly 114 is illustrated in FIGS. 2 and 3. The check valve and filter assembly 114 includes a first end 116 and a second end 118. The first end 116 defines a segmented annular positioning member having at least one notch 144N in an outer surface 144 of the annular positioning member 116. The check valve and filter assembly 114 further includes a substantially cylindrical body 120, and a substantially cylindrical inner wall 122 concentrically arranged within a substantially cylindrical outer wall 124. The inner wall 122, outer wall 124, and body 120 define an annular groove 126.

The outer wall 124 has a plurality of fluid outlet openings 128 formed therein. The inner wall 122 defines a first longitudinal fluid passage 130 which is in fluid communication with the longitudinal fluid passage 94 of the valve seat member 72. The first longitudinal fluid passage 130 may have any desired diameter or combinations of diameters and may thus may control fluid flow based on the fluid flow requirements of the valve in which the check valve and filter assembly 114 is installed. For example, a plurality of check valve and filter assemblies, each having a different size fluid passage 130 may be used for a valve. The fluid passage 130 may have any desired diameter, such as a diameter within the range of from about 0.35 mm to about 0.85 mm.

The second end 118 of the check valve and filter assembly 114 includes a substantially cylindrical filter cavity 134. A second longitudinal fluid passage 136 is formed within the body 120 radially outwardly of the first longitudinal fluid passage 130 and is in fluid communication with the annular groove 126. The second longitudinal fluid passage 136 defines a check valve seat 138. A check valve closing element or ball 139 is disposed in the second longitudinal fluid passage 136.

A filter housing 140 is substantially cylindrical and is mounted within the cavity 134 of the check valve and filter assembly 114 in a snap fit or interference fit connection. A substantially disk-shaped filter portion (not shown) may be attached to an outboard end surface 140B of the filter housing 140. An inboard end surface 140A of the filter housing 140 closes the second longitudinal fluid passage 136 and retains the ball 139 within the passage 136.

The check valve and filter assembly 114 also define two fluid seals. The first seal 154 is defined between an outer surface 142 of the body 120 and the bore 35. The second seal 156 is defined between an outer surface 123 of the inner wall 122 and an inner surface of the longitudinal fluid passage 94 of the valve seat member 72. The check valve and filter assembly 114 and the filter housing 140 may be formed from any desired material such as polyphenylene sulfide (PPS), polythalamide (PPA), and the like.

During assembly of the illustrated embodiment of the isolation valve 25 into the housing 2, the valve 25 is disposed within the bore 35 of the housing 2 such that the flange 68 is supported on a shoulder portion 4 of the bore 35.

In the illustrated embodiment, the flange 68 of the valve body 62, and therefore the isolation valve 25 to which the valve body 62 is attached, is retained within the bore 35 by clinching, wherein material of the housing 2 is forced into engagement with a first surface (an upwardly facing surface when viewing FIG. 2) of the flange 68. The valve body 62 may also be retained in the bore 35 by any desired mechanical or chemical means operative to retain the isolation valve 25 within the bore 35.

Figure 5:
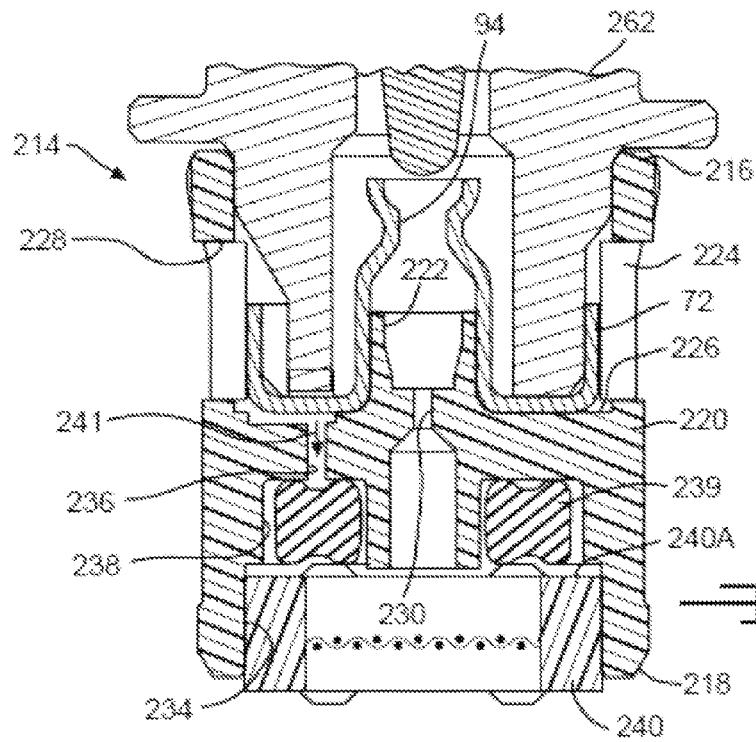
FIG. 5 is an enlarged perspective view of a portion of the isolation valve illustrated in FIG. 2, showing a second embodiment of a check valve.

FIG. 5 illustrates a second embodiment of the check valve assembly 214. The check valve assembly 214 is similar to the check valve and filter assembly 114 and includes a first end 216 attached to the valve body 262 and a second end 218. The check valve assembly 214 further includes a substantially cylindrical body 220, and a substantially cylindrical inner wall 222 concentrically arranged within a substantially cylindrical outer wall 224. The inner wall 222, outer wall 224, and body 220 define an annular groove 226.

The outer wall 224 has a plurality of fluid outlet openings 228 formed therein. The inner wall 222 defines a first longitudinal fluid passage 230 which is in fluid communication with the longitudinal fluid passage 94 of the valve seat member 72. The second end 218 of the check valve assembly 214 includes a substantially cylindrical filter cavity 234. A second longitudinal fluid passage 236 is formed within the body 220 radially outwardly of the first longitudinal fluid passage 230 and is in fluid communication with the annular groove 226. An annular seal groove 238 is formed at the second end 218 adjacent the filter cavity 234. An annular lobe seal 239 is disposed in the seal groove 238. The lobe seal 239 allows fluid flow outward of the check valve assembly 214 through the second longitudinal fluid passage 236 (in the direction of the arrow 241), but not into the check valve assembly 214 through the second longitudinal fluid passage 236.

A filter housing 240 is substantially cylindrical and is mounted within the cavity 234 of the check valve assembly 214 in a snap fit or interference fit connection. An inboard end surface 240A of the filter housing 240 closes the annular seal groove 238 and retains the lobe seal 239 within the annular seal groove 238.

Figure 6:
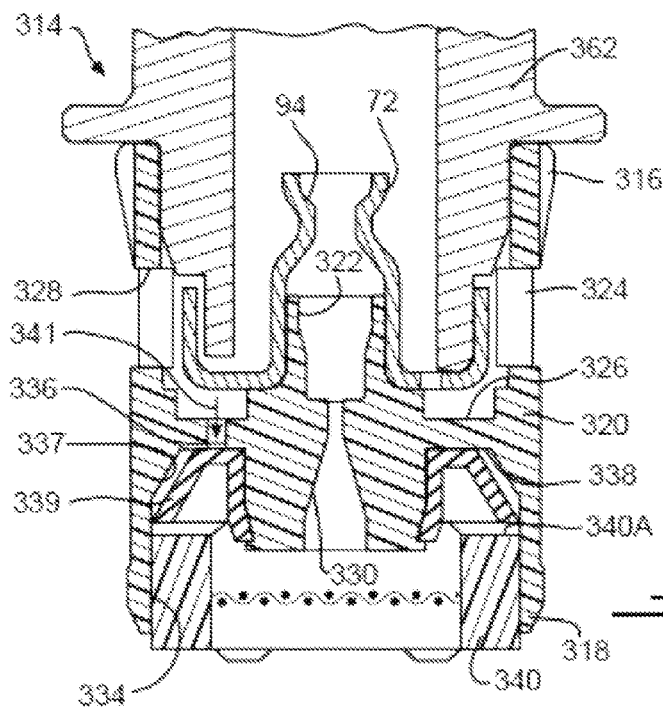
FIG. 6 is an enlarged perspective view of a portion of the isolation valve illustrated in FIG. 2, showing a third embodiment of a check valve.

FIG. 6 illustrates a third embodiment of the check valve assembly 314. The check valve assembly 314 is similar to the check valve assembly 214 and includes a first end 316 attached to the valve body 362 and a second end 318. The check valve assembly 314 further includes a substantially cylindrical body 320, and a substantially cylindrical inner wall 322 concentrically arranged within a substantially cylindrical outer wall 324. The inner wall 322, outer wall 324, and body 320 define an annular groove 326.

The outer wall 324 has a plurality of fluid outlet openings 328 formed therein. The inner wall 322 defines a first longitudinal fluid passage 330 which is in fluid communication with the longitudinal fluid passage 94 of the valve seat member 72. The second end 318 of the check valve assembly 314 includes a substantially cylindrical filter cavity 334. A second longitudinal fluid passage 336 is formed within the body 320 radially outwardly of the first longitudinal fluid passage 330 and is in fluid communication with the annular groove 326. An annular seal groove 338 is formed at the second end 318 adjacent the filter cavity 334.

The annular seal groove 338 includes a lip seal groove portion 337. As shown in FIG. 6, the lip seal groove portion 337 is formed in a frusto-conical manner, as best described in WIPO Publication No. WO/2008/097534, the description of the lip seal and lip seal groove disclosed therein are incorporated herein by reference.

An annular lip seal 339 is disposed in the seal groove 338. The lip seal 339 allows fluid flow outward of the check valve assembly 314 through the second longitudinal fluid passage 336 (in the direction of the arrow 341), but not into the check valve assembly 314 through the second longitudinal fluid passage 336.

A filter housing 340 is substantially cylindrical and is mounted within the cavity 334 of the check valve assembly 314 in a snap fit or interference fit connection. An inboard end surface 340A of the filter housing 340 closes the annular seal groove 338 and retains the lip seal 339 within the annular seal groove 338.

FIG. 7 includes an alternate embodiment of the tappet 458. The tappet 458 includes a rounded or substantially semi-spherical portion 458S at the nose of the tappet 458, a substantially cylindrical portion 458C extending from the semi-spherical portion 458S a distance $D_C$ (extending upwardly when viewing FIGS. 7 and 13), and a tapered portion 458T (also illustrated by the phantom line 808T' in FIG. 13) extending from the substantially cylindrical portion 458C (extending upwardly when viewing FIGS. 7 and 13).

Figure 8:
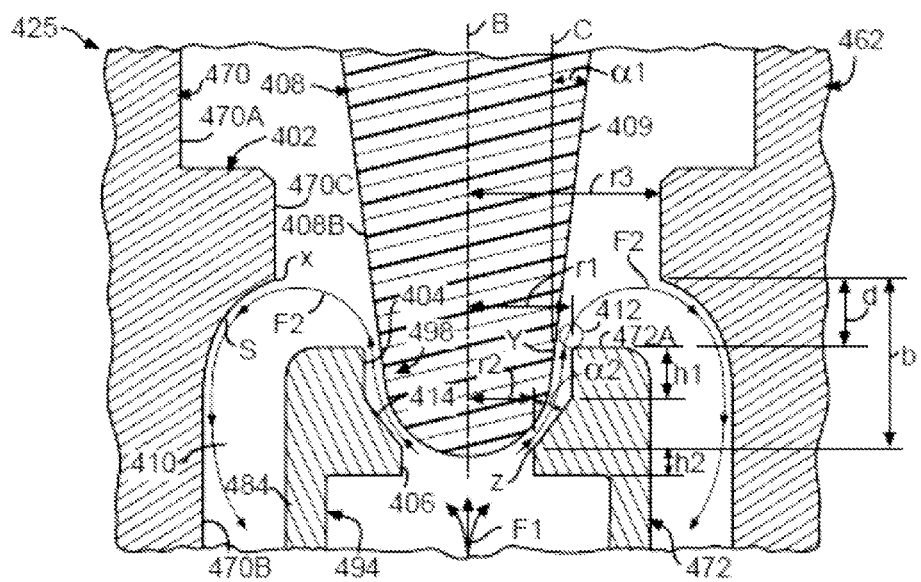
FIG. 8 is an enlarged cross-sectional view of a portion of a second embodiment of the isolation valve.

In the embodiments illustrated in FIGS. 7 and 8, the semi-spherical portion 458S has a radius r4. The radius r4 may be any desired length, such as about 0.634 mm. The radius r4 may also be within the range of from about 0.620 mm to about 0.648 mm. Alternatively, the radius r4 may be within the range of from about 0.600 mm to about 0.660 mm.

It will be understood that the axial length of the substantially cylindrical portion 458C may be varied to achieve a desired brake performance, such as a desired base brake performance. It will be further understood that the tappet 458 may be formed without the substantially cylindrical portion 458C. For example, the tappet 808 illustrated in FIG. 13 includes the substantially semi-spherical portion 808S and the tapered portion 808T, wherein the tapered portion 808T intersects the substantially semi-spherical portion 808S at 0 degrees and 180 degrees of the arc of the semi-spherical portion 808S.

Figure 13:
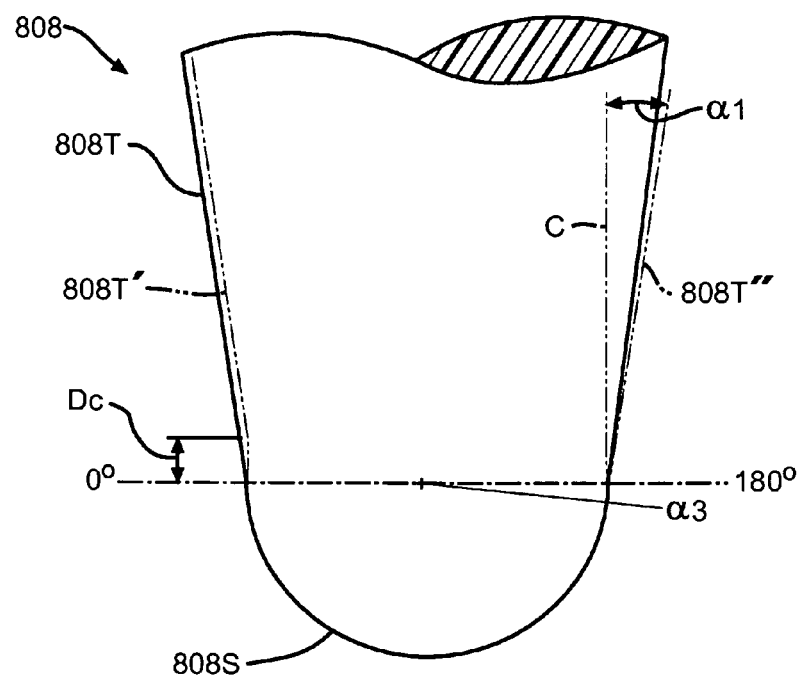
FIG. 13 is an enlarged elevational view of a fifth embodiment of the tappet illustrated in FIGS. 2 and 7.

If desired, the tappet may be formed wherein the tapered portion of the tappet 808 may also extend tangentially at the angle α1, described in detail below, from the substantially semi-spherical portion 808S as illustrated by the phantom line 808T" in FIG. 13. As illustrated in FIG. 13, the tapered portion 808T" intersects the substantially semi-spherical portion 808S at an angle α3, which is less than 180 degrees of the arc of the semi-spherical portion 808S (below the 0°-180° degree line in FIG. 13).

It will be understood that although the valve seat member 472 illustrated in FIG. 8 may be machined and the valve seat member 72 illustrated in FIGS. 2, 3, and 7 is cold formed, the relative dimensions and relative shapes between the valve seat 98, the tappet 458, and the valve body 62 may be substantially the same as the valve seat 498, the tappet 408, and the valve body 462, respectively. It will be further understood that although the valve seat member 472 is a machined part, the valve seat member and the valve seat may be formed as a deep drawn part, similar to the valve seat member 72 shown in FIG. 7, but wherein the upper portion of the valve seat member may be formed radially inwardly and downwardly to define the valve seat.

Referring now to FIG. 8, a portion of a second embodiment of an isolation valve is indicated generally at 425 in FIG. 8. The portion of the isolation valve 425 illustrated in FIG. 8 includes a portion of the tappet 408, a portion of the valve body 462, and a portion of the valve seat member 472. A longitudinally extending central opening or bore 470 is formed through the valve body 462 and includes a central longitudinal axis B.

The bore 470 of the valve body 462 includes a first cylindrical portion 470A, a second cylindrical portion 470B, and a radially inwardly extending flange 402 between the first and second cylindrical portions 470A and 470B defining a third cylindrical portion 470C. The third cylindrical portion 470C has a third radius r3. The third radius r3 may be any desired length, such as about 1.375 mm. The radius r3 may also be within the range of from about 1.35 mm to about 1.40 mm. Alternatively, the radius r3 may be within the range of from about 1.20 mm to about 1.55 mm.

The rounded shoulder S may have any desired radius. In the illustrated embodiment, the radius may be defined as a ratio wherein the shoulder radius $S_r$=1.32*spherical radius r4. The shoulder radius $S_r$ may also be within the range of from about 1.07*spherical radius r4 to about 1.57*spherical radius r4. Alternatively, the shoulder radius $S_r$ may be within the range of from about 0.95*spherical radius r4 to about 1.69*spherical radius r4. In the illustrated embodiment, the second cylindrical portion 470B has a diameter larger than the diameter of the third cylindrical portion 470C. The first cylindrical portion 470A has a diameter larger than the diameter of the second and third cylindrical portions 470B and 470C.

The tappet 408 includes a first end (not shown in FIG. 8), a second end 408B, and an outer surface 409. As shown in FIG. 8, the outer surface of the second end 408B of the tappet 408 is tapered at an angle α1 measured from a line C parallel with the axis B. The intersection of the line C and the outer surface of the second end 408B of the tappet 408 defines an intersection Y. The angle α1 may be any desired angle, such as about 7.5 degrees. The angle α1 may also be within the range of from about 7.0 degrees to about 8.0 degrees. Alternatively, the angle α1 may be within the range of from about 5.0 degrees to about 10.0 degrees.

The illustrated valve seat member 472 includes a substantially cylindrical wall 484 defining a longitudinal fluid passage 494 that terminates at a first end 472A of the valve seat member 472 in a reduced diameter orifice or opening defining a valve seat 498. The valve seat 498 includes a first cylindrical wall 404 having a first radius r1 and a first axial length or height h1, a second cylindrical wall 406 having a second radius r2 and a second axial length or height h2, and a tapered intermediate wall 414 between the first cylindrical wall 404 and the second cylindrical wall 406. The intersection of the second cylindrical wall 406 and the tapered intermediate wall 414 defines an intersection z. The annular space 410 between the second cylindrical portion 470B and the cylindrical wall 484 defines an intermediate fluid flow outlet passageway.

The height h1 may be any desired length. In the illustrated embodiment, the height h1 may be defined as a ratio wherein the height h1=0.55*spherical radius r4. The height h1 may also be within the range of from about 0.47*spherical radius r4 to about 0.63*spherical radius r4. Alternatively, the height h1 may be within the range of from about 0.32*spherical radius r4 to about 0.78*spherical radius r4. The height h2 may be any desired length. In the illustrated embodiment, the height h2 may be defined as a ratio wherein the height h2=0.32*spherical radius r4. The height h2 may also be within the range of from about 0.32*spherical radius r4 to about 0.47*spherical radius r4. Alternatively, the height h2 may be within the range of from about 0.32*spherical radius r4 to about 0.63*spherical radius r4.

The rounded shoulder S may have any desired radius. In the illustrated embodiment, the radius may be defined as a ratio wherein the shoulder radius $S_r$=1.32*spherical radius r4. The ratio shoulder radius $S_r$ may also be within the range of from about 1.07*spherical radius r4 to about 1.57*spherical radius r4. Alternatively, the shoulder radius $S_r$ may be within the range of from about 0.95*spherical radius r4 to about 1.69*spherical radius r4.

The first radius r1 may be any desired length. In the illustrated embodiment, the first radius r1 may be defined as a ratio wherein the first radius r1=1.16*spherical radius r4. The first radius r1 may also be within the range of from about 1.14*spherical radius r4 to about 1.18*spherical radius r4. Alternatively, the first radius r1 may be within the range of from about 1.07*spherical radius r4 to about 1.25*spherical radius r4. The second radius r2 may be any desired length. In the illustrated embodiment, the second radius r2 may be defined as a ratio wherein the second radius r2=0.67*spherical radius r4. The second radius r2 may also be within the range of from about 0.66*spherical radius r4 to about 0.68*spherical radius r4. Alternatively, the second radius r2 may be within the range of from about 0.65*spherical radius r4 to about 0.69*spherical radius r4. The third radius r3 may be any desired length. In the illustrated embodiment, the third radius r3 may be defined as a ratio wherein the third radius r3=2.17*spherical radius r4. The third radius r3 may also be within the range of from about 2.13*spherical radius r4 to about 2.21*spherical radius r4. Alternatively, the third radius r3 may be within the range of from about 1.89*spherical radius r4 to about 2.45*spherical radius r4.

In the illustrated embodiment, the intermediate wall 414 is formed at an angle α2 of about 40.5 degrees relative to the axis B. The angle α2 may also be an angle within the range of from about 40.0 degrees to about 41.0 degrees. Alternatively, the angle α2 may be within the range of from about 38.0 degrees to about 43.5 degrees.

Referring again to the valve body 462 illustrated in FIG. 8, the intersection x is axially spaced apart from the intersection z a distance b. The distance b may be any desired distance, such as about 1.25 mm. The distance b may also be within the range of from about 1.20 mm to about 1.30 mm. Alternatively, the distance b may be within the range of from about 1.10 mm to about 1.40 mm.

A first or converging fluid flow path within the longitudinal fluid passage 472 is indicated by the arrow F1. A second or divergent fluid flow path is indicated by the arrows F2 and further defines an intermediate outlet flow path.

As fluid is forced upward (indicated by the arrows F2) along an outer surface 409 of the tappet 408, fluid pressure along the tappet outer surface 409 is reduced. The tapered shape of the tappet 408 causes a reduction of the upward flow pressure force relative to a similar tappet without the illustrated taper.

Figure 9:
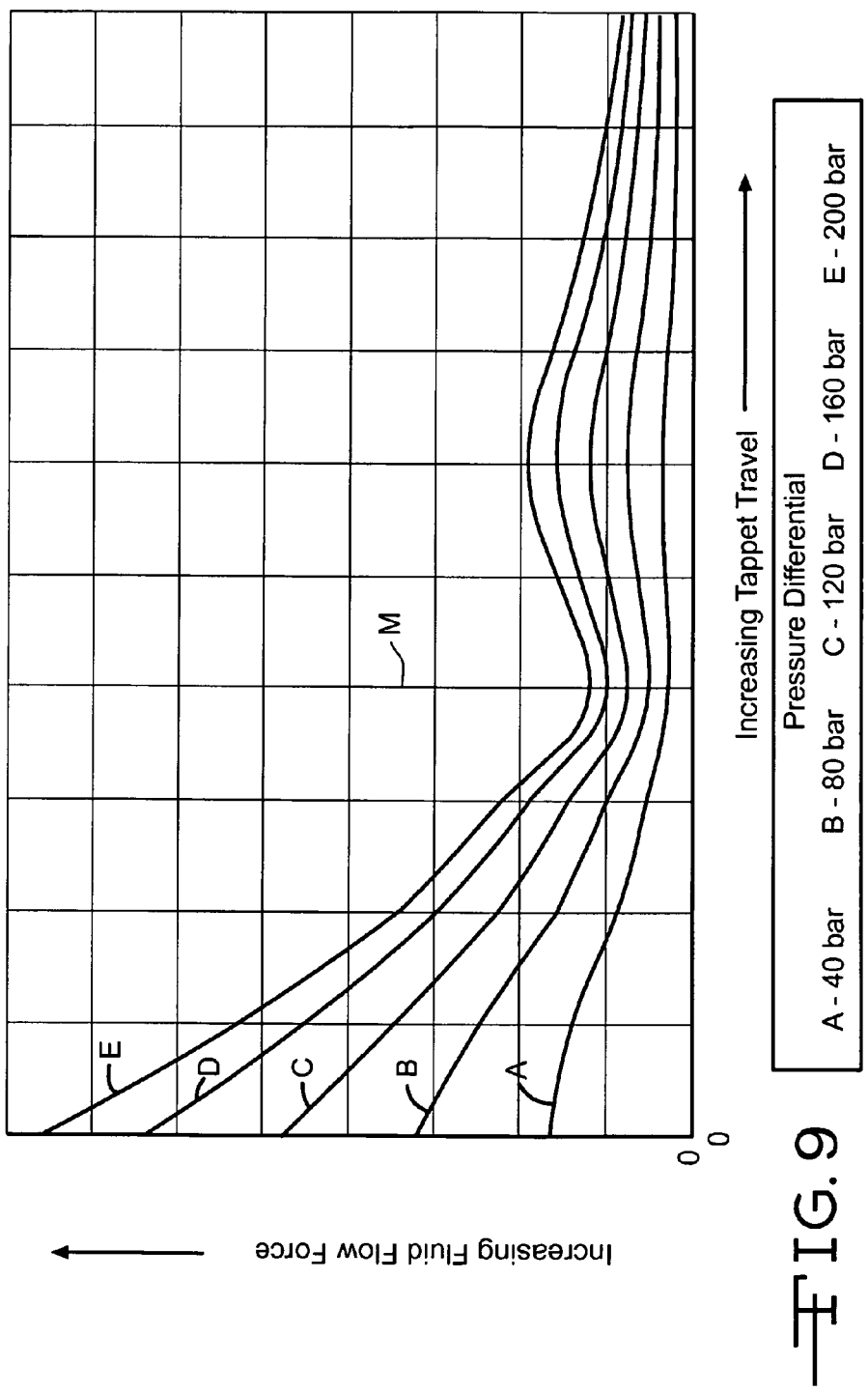
FIG. 9 is a graph of fluid flow force to tappet travel in the isolation valve illustrated in FIG. 2.

FIG. 9 illustrates an exemplary plot of increasing hydraulic flow force to increasing distance traveled by the tappet 408 at five representative pressure differential levels (measured in bar). As shown, and as a result of the taper angle α1, a relatively steep drop in hydraulic flow force occurs during valve opening until the valve opens to a first or minimum open position. It has been shown that increasing the taper angle α1 will maximize the benefit, described below, of the steep drop in the flow force illustrated in FIG. 9.

The combined shapes of the valve seat 498, the tappet 408, and the valve body 462 cause fluid to flow along a path generally illustrated by the arrows F2. Fluid is caused to separate or flow radially outwardly of the tapered surface 409 of the tappet 408 after the fluid has moved beyond the intersection Y (upward of the intersection Y when viewing FIG. 8) a distance. The region, indicated generally by the circle 412, where the fluid is caused to flow radially outwardly of the tapered surface 409 of the tappet 408 will vary based on the positions of the outlet passageway 410 and the valve seat 498. For example, the greater the distance between the intersection x and the intersection z (i.e. the greater the distance h), the smaller the third radius r3, and the larger the roundness or the radius of the shoulder S, the further the fluid may flow along the tapered surface 409 of the tappet 408 (upwardly when viewing FIG. 8) before flowing radially outwardly of the tapered surface 409 and toward the outlet passageway 410. As the region 412, where the fluid is caused to flow radially outwardly of the tapered surface 409, moves further from the intersection Y, a region of low pressure on the tappet surface 409 increases. This increased region of low pressure on the tappet surface 409 may be represented by the relatively steep negative slope of the force to travel curve as the valve 425 opens, as shown in FIG. 9. The increased region of low pressure on the tappet surface 409 may be increased by increasing the height h1 and decreasing the first radius r1. The increased region of low pressure on the tappet surface 409 may also be increased by increasing the height h2, or changing the distance d between the intersection x and the first end 472A.

The distance d may be any desired length. In the illustrated embodiment, the distance d may be defined as a ratio wherein the distance d=0.85*spherical radius r4. The distance d may also be within the range of from about 0.77*spherical radius r4 to about 0.93*spherical radius r4. Alternatively, the distance d may be within the range of from about 0.62*spherical radius r4 to about 1.08*spherical radius r4.

The steep drop in flow force experienced as the valve 425 moves between a closed position and a minimum open position M can be varied by adjusting the shapes and the dimensions of the valve seat 498, the tappet 408, and the valve body 462. It will be understood that the minimum open position M may be any desired amount of tappet travel and may be determined by the desired characteristics of the valve 425.

Advantageously, the steep negative force to travel curve as shown in FIG. 9, is indicative of significantly improved valve control. As used herein, improved valve control is defined as a very small change in valve opening with a relatively large change in balancing or controlling magnetic force level when the magnetic force is applied to close the valve to a desired position, also known as control resolution.

In embodiments of similar valves having a flatter (more horizontal) force to travel curve, the tappet is caused to move more and may undesirably oscillate with each small change in the magnetic force level. Accordingly, the structure of the valve 425 as shown in FIG. 8 and described herein, provides the improved and decisive valve control, or control resolution required in ABS operation. The structure of the valve 425 also improves NVH, and ensures proper valve flow metering in ABS operation.

The spring 76 is disposed between and engages the valve body 62 and the tappet 108. As a further advantage of the illustrated valves 25, 425, fluid flows along the intermediate outlet flow path F2 between the valve seat 98 and the closing element 108, radially outward of the closing element 108 to the intermediate fluid flow outlet passageway 410 defined by the annular space between the valve seat member 72 and the valve body 62, such that the intermediate outlet flow path F2 does not flow through and is not altered by, the spring 76.

Referring again to FIG. 9, the force to travel curve indicates an increase in hydraulic or fluid flow force at a valve opening mark or a point of tappet travel greater than the minimum open position M (illustrated as a hump in the graph). This hump is caused by flow separation from the tappet surface 409 at a point closer to the intersection Y relative to smaller tappet travel distances (i.e., the valve having a smaller opening). The illustrated increase in force represented by the hump may be beneficial during normal braking and during large valve opening and large fluid flow situations. For example, in normal braking an upward force is desirable to prevent tappet pull-down due to a large pressure differential (such as from sudden stop or an apply spike). Such a large pressure differential may cause valve shut-off and an undesirable loss of brakes. Without the illustrated hump, the valve may experience a negative or pull-down force at larger valve opening values, and the inability to brake normally. The valve 425, and its resultant force to travel curve, ensures that a positive force is maintained for larger valve opening values, and ensures excellent ABS operation without compromising normal braking.

Significantly, the valves 25 and 425 described and illustrated herein provide significantly improved analog control or the ability to ensure that valve output or response is proportional to the input command. Specifically, the valve output, as defined by fluid flow through the valve is proportional to the valve input, as defined by current at the coil assembly 74, for a specified pressure differential. In the illustrated embodiments, the analog control of the valves 25 and 425 approaches optimal, or 1:1, proportionality.

In another embodiment, the valve 425 may be assembled without the spring 76, which applies a pre-load the tappet 408. In the embodiment of the valve 25 illustrated in FIG. 2, the spring 76 urges the tappet 108 away from the valve seat member 72 and keeps the valve 25 open until a pull-down force of about 1 N is reached in normal braking. As shown in FIG. 9, a positive push-up force acts on the tappet 408 of the valve 425 across the range of typical operating pressure differentials, shown by lines A through E in FIG. 9. For example, at a pressure of about 200 bar, the push-up force acting on the tappet 408 is above 1 N from 0 to about 0.250 mm of tappet travel. Accordingly, the push-up force acting on the tappet 408 increases with an increase in pressure differential, even at larger valve opening values. Thus, the illustrated valve 425 provides improved performance relative to other known tappet-type solenoid valves in ABS and in normal braking operation by providing improved analog control, performance, and NVH characteristics.

Figures 10, 11, 12:
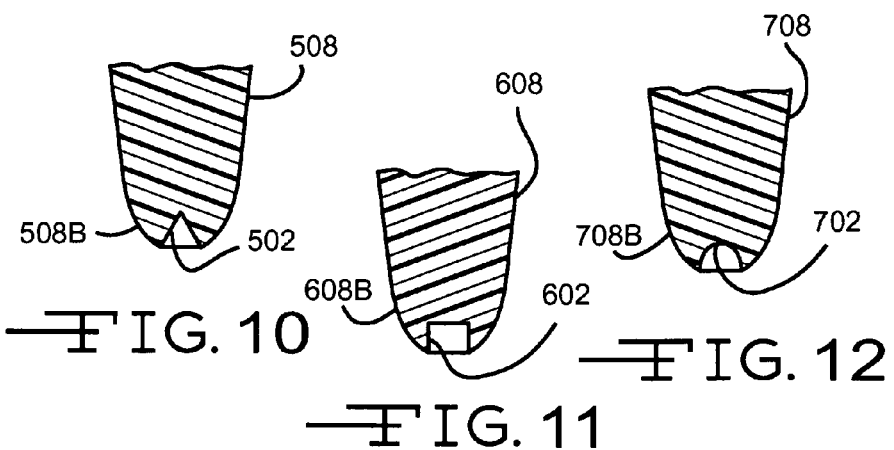
FIG. 10 is an enlarged cross-sectional view of a second embodiment of the tappet illustrated in FIGS. 2 and 7.
FIG. 11 is an enlarged cross-sectional view of a third embodiment of the tappet illustrated in FIGS. 2 and 7.
FIG. 12 is an enlarged cross-sectional view of a fourth embodiment of the tappet illustrated in FIGS. 2 and 7.

Referring now to FIGS. 10 through 12, alternate embodiments of the tappet are illustrated. In FIG. 10, a conical shaped cavity 502 is formed in the second end 508B of the tappet 508.

In many solenoid valves having a round-nose tappet used in ABS applications, a pull-in (toward the valve seat) force may occur due to Bernoulli forces acting on the tappet when the valve is opened. Such a pull-in force can occur during base brake apply, spike apply, or when there is a sudden high fluid flow, and a when a large pressure differential. Advantageously, in a valve with the tappet 508 having the conical shaped cavity 502, there is an increase in the fluid flow force at the second end 508B of the tappet 508 when the tappet 508 is in a fully opened position. Conversely, the conical shaped cavity 502 has substantially no effect in a metered flow position, such as during an ABS event, and there is an increase in the fluid flow force at the second end 508B of the tappet 508 when the tappet 508 is in a fully opened position.

It will be understood that the second end 508B of the tappet 508 may have a cavity of any desired shape. For example, FIG. 11 illustrates a cavity 602 formed in the second end 608B of the tappet 608. The illustrated cavity 602 has a substantially square shaped opening and each of the interior walls of the cavity 602 are also squares, thus defining a cube shaped cavity. Alternatively, the cavity 602 may have substantially rectangular shaped opening and each of the interior walls of the cavity 602 may also be rectangular.

FIG. 12 illustrates a concave cavity 702 formed in the second end 708B of the tappet 708. In the embodiments illustrated in FIGS. 10 through 12, the cavities 502, 602, and 702 are substantially symmetrical. Alternatively, other substantially symmetrical and non-symmetrical cavities may be formed in the rounded second end of the tappet.

The principle and mode of operation of the control valve have been described in its various embodiments. However, it should be noted that the control valves described herein may be practiced otherwise than as specifically illustrated and described without departing from its scope.

What is claimed is:

1. An electromagnetic valve for use in controlling fluid flow between first and second passageways in a hydraulic valve block, comprising:
   a valve body defining a central axis and having a central opening therethrough, the valve body having a lower end adapted to be inserted into a bore of the valve block;
   a hollow valve dome attached to an upper end of the valve body;
   an armature axially moveable within the valve dome;
   a spring for biasing the armature in one axial direction;
   a closing element coupled to a lower end of the armature;
   an electromagnetic coil coaxially surrounding the armature and operable to effect axial movement of the armature in an axial direction opposite the one axial direction;
   a valve seat member carried by a lower end of the valve body and having an orifice providing fluid flow between the first and second valve block passageways, the valve seat member defining a valve seat surrounding the orifice and cooperating with the closing element for selectively closing the orifice, characterized in that:
   the valve seat member is formed as a deep drawn part and includes a tubular inner wall defining an inner tubular portion concentrically arranged with a tubular outer wall defining an outer tubular portion, the inner tubular portion and the outer tubular portion connected by a radially extending wall, an inside surface of the outer tubular portion engaging an outside surface of the lower end of the valve body, one end of the inner tubular portion defining a valve seat.

2. The valve according to claim 1, wherein the tubular portion includes an upwardly facing chamfered surface for engagement with the closing element, the lower end of the chamfered surface terminating at or near the valve orifice, and the upper end of the chamfered surface terminating at or near an axially extending outlet opening.

3. The valve according to claim 1, wherein the radially extending wall defines a stop member provided on the deep drawn part for engagement with the valve body for axially locating the valve seat member relative to the valve body.

4. The valve according to claim 1, wherein the inner tubular portion is formed to include a circular edge facing upwardly in the direction of the armature, and including a reduced diameter section spaced downwardly from the circular edge to define an upwardly facing valve seat and the valve orifice.

5. The valve according to claim 1 wherein an upper end the inner tubular member projects upwardly into the valve body bore, and the valve body bore cooperate to define an annular fluid passageway.

6. The valve according to claim 1 wherein the radially extending wall and the outer tubular portion cooperate to define a passageway in communication with the valve orifice and one of the first and second passageways.

7. The valve according to claim 6, wherein the lower end of the valve body includes a radially extending notch defining a portion of the passageway.

8. The valve according to claim 7, wherein the outside surface of the lower end of the valve body includes a longitudinally extending groove radially aligned with and extending axially from the notch, the groove and the notch defining a portion of the passageway.

9. The valve according to claim 1 wherein the closing element is an axially extending tappet configured with an end portion formed as a partial sphere for engagement with the valve seat.

10. The valve according to claim 9 wherein the tappet includes a tapered portion having a lower reduced diameter portion and an upper portion which defines an upper diameter greater than the lower diameter, and wherein the angle of the taper is less than 10.0 degrees.

11. The valve according to claim 9 wherein the upper end of the tappet is received within a central bore formed in the armature, and including an adjusting element located in the armature and engageable with the upper end of the tappet for axially positioning the tappet relative to the lower end of the armature.

12. The valve according to claim 9 wherein, when the closing element is seated on the valve seat, the lowermost end of the tapered portion is near or below the uppermost end of the valve seat.

13. The valve according to claim 9, wherein the lowermost end of the tappet is provide with a depression.

14. The valve according to claim 9, wherein the valve body is provided with a shoulder spaced above the uppermost end of the valve seat by a predetermined distance for redirecting upward fluid flow from the valve seat in a downward direction along the inner wall of the valve bore.

15. The valve according to claim 14, wherein a curved wall connects to the shoulder with the inner wall of the valve bore.

16. The valve according to claim 14 wherein a chamfered wall connects the shoulder with the inner wall of the valve bore.

17. The valve according to claim 14, wherein the spring is positioned in the valve body above the shoulder.

18. The valve according to claim 14, wherein the upper end of the valve seat defines an outlet diameter, and wherein the valve body shoulder is spaced above the upper end of the valve seat a distance about equal to the outlet diameter.

19. The valve according to claim 1, wherein a filter assembly is mounted on the lower end of the valve body.

20. The valve according to claim 19, wherein the filter incorporates a check valve in the form of one of a quad seal and a lip seal.

* * * * *